United States Patent [19]
Lee

[11] Patent Number: 6,033,069
[45] Date of Patent: Mar. 7, 2000

[54] COUPLING DEVICE FOR EYEGLASSES

[76] Inventor: Hwi Jae Lee, 201-905 Samik-newtown Apt. #308-11, Naedang-dong, Seo-gu, Taegu, Rep. of Korea

[21] Appl. No.: 09/248,121

[22] Filed: Feb. 11, 1999

[30] Foreign Application Priority Data

Apr. 25, 1998 [KR] Rep. of Korea ....................... 98-15820

[51] Int. Cl.[7] ....................................................... G02C 5/16
[52] U.S. Cl. ............................................ 351/113; 351/114
[58] Field of Search ..................................... 351/113, 114, 351/111, 115, 119, 140, 153, 41; 16/128

[56] References Cited

U.S. PATENT DOCUMENTS 5,739,891 4/1998 Wei .......................................... 351/113

*Primary Examiner*—Hung Xuan Dang

[57] ABSTRACT

A temple hinge device for an eyeglasses includes a coupling slip member attached to each lens frames of the eyeglasses and having an eccentric slot, a joint member attached to each temple of the eyeglasses and having a hollow portion, a pair of slits, a pair of apertures and a shaft pin for fastening the coupling slip through the eccentric slot and apertures, and a spring support member with a spring for slidably inserting into the hollow portion of the joint member. The temple hinge device allows the temples of the eyeglasses to be easily and effectively folded and unfolded by the operation of the spring.

14 Claims, 3 Drawing Sheets

COUPLING DEVICE FOR EYEGLASSES

BACKGROUND OF THE INVENTION

1. Field of the Invention

The present invention relates to a coupling device for eyeglasses and more particularly, to a temple hinge device for eyeglasses for elastically moving the temples of the eyeglasses.

2. Description of Related Art

Generally, it is desired that a temple hinge device for an eyeglasses be small in size and slim in appearance to suit glass wearers. Various types of temple hinge devices for eyeglasses are known in the art. FIG. 1 shows an example of a conventional temple hinge device for an eyeglasses.

As shown in FIG. 1, a conventional temple hinge device for an eyeglasses 100 includes a joint member 104 attached to an outer edge of a lens frame 102, a coupling slip member 108 connected to the joint member 104 by a pivot pin 106, and a support slip member 110 elastically connected to the coupling slip member 108 by a spring formed within a connection slot 114. A temple member 112 of the eyeglasses 100 is inserted into the support slip member 110. The coupling slip member 108 is typically thick and wide to be less visible from the front of the eyeglasses 100.

Such a conventional hinge device, however, suffers from a number of problems. For example, in order to make the joint member 104 less visible from the front and to connect the coupling slip member 108 to the spring disposed within the support slip member 110 through the connection slot 114, the coupling slip member 108 or the support slip member 110 has to have a certain size. This results in an eyeglasses which is large and unattractive. Further, it is complicated to assemble such eyeglasses because the step for assembling the coupling slip member 108 to the connection slot 114 is difficult to execute since the spring has to be pulled up before the assembling can start.

SUMMARY OF THE INVENTION

Accordingly, it is an object of the present invention to provide a coupling device for an eyeglasses, which eliminates the above and other problems encountered with conventional temple hinge devices for eyeglasses.

Another object of the present invention is to provide a coupling device for an eyeglasses, which provides a coupling slip member to be easily and effective assembled to a joint member containing a spring support member.

Still another object of the present invention is to provide an improved temple hinge device for an eyeglasses, which includes a coupling slip member attached to a lens frame of the eyeglasses and having an eccentric slot, a joint member attached to a temple of the eyeglasses and having a hollow portion, a pair of slits, a pair of apertures and a shaft pin for fastening the coupling slip member through the eccentric slot and the apertures, and a T-shape spring support member with a spring for slidably inserting into the hollow portion of the joint member, whereby the pair of temples of the eyeglasses can be easily and effectively folded or unfolded by pressing the spring.

Still another object of the present invention is to provide a coupling device for eyeglasses, which is simple in structure, inexpensive to manufacture, durable in use, and refined in appearance.

Other objects and further scope of applicability of the present invention will become apparent from the detailed description given hereinafter. It should be understood, however, that the detailed and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
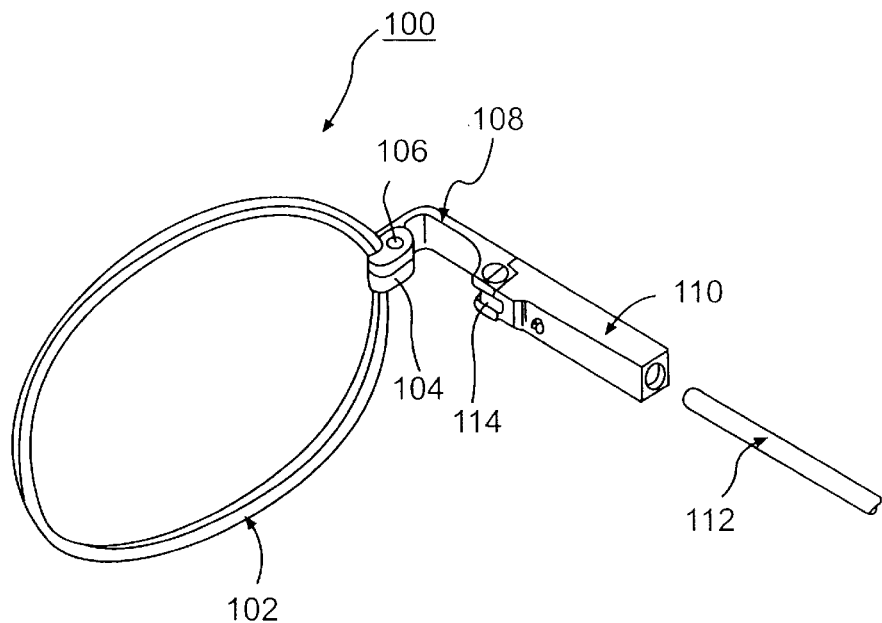
FIG. 1 is a perspective view of a conventional temple hinge for an eyeglasses.
Figure 2:
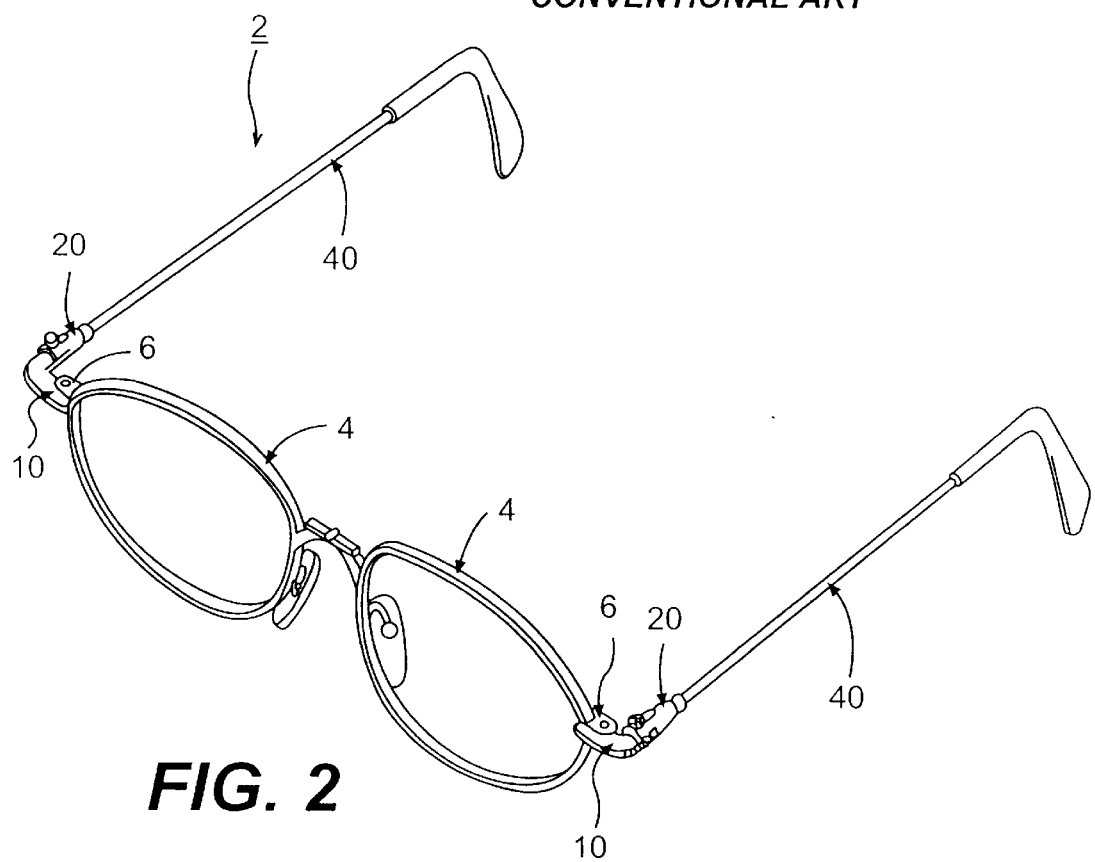
FIG. 2 is a perspective view of a coupling device for an eyeglasses according to the present invention.
Figure 3:
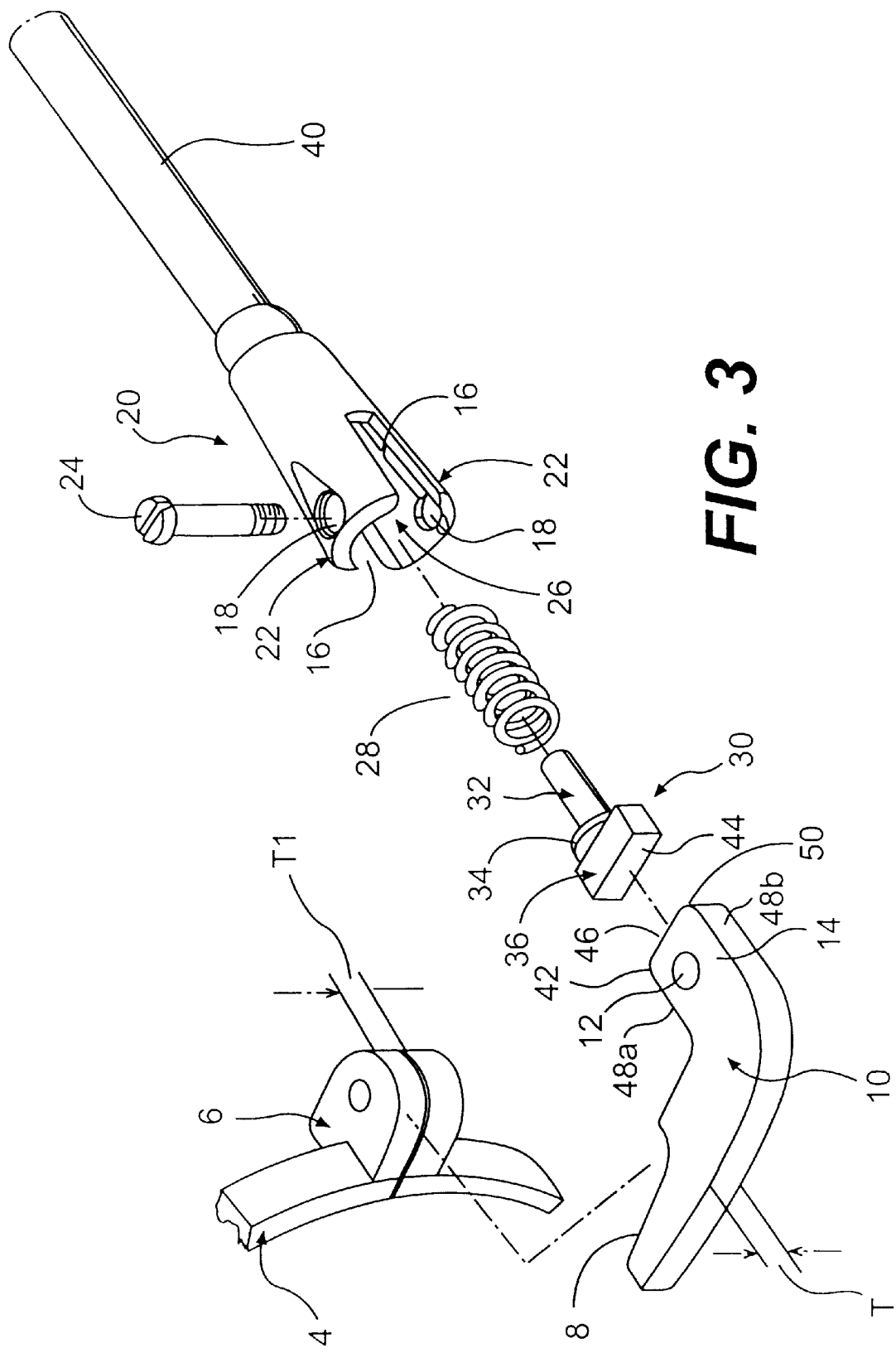
FIG. 3 is an exploded perspective view of the coupling device of FIG. 2.

Referring now in detail to the drawings for the purpose of illustrating preferred embodiments of the present invention, FIGS. 2 and 3 show a coupling device for an eyeglasses 2 according to the embodiments of the present invention. As shown therein, the coupling device includes a coupling slip member 10 attached to a front surface 7 of a connection slip 6, a joint member 20 attached to each temple 40 of the eyeglasses 2 and having a hollow portion 26 disposed in the central portion thereof, and a spring support member 30 disposed within the hollow portion 26 of the joint member 20. The connection slip 6 protrudes from each lens frame 4, and the joint member 20 is pivotally connected to the coupling slip member 10.

The coupling slip member 10, e.g., made of a plate by pressing, contains a welding part 8 and a coupling part 14 disposed at both ends thereof. Since the thickness "T" of the welding part 8 is almost the same as a thickness "T1" of the connection slip 6, the coupling slip member 10 is tightly secured to the connection slip 6. The connection slip 6 may be welded to the welding part, or is fixed in other ways known in the art. The coupling part 14 has an eccentric slot 12, first and second corners 42 and 50, a bottom face 46, and side surfaces 48a and 48b.

The joint member 20, having a tapered configuration or other configurations, contains a pair of slits 16 carved at both sides thereof for providing a pair of joint parts 22, and a shaft pin 24 being screwed into a pair of apertures 18 and the eccentric slot 12 in order to pivotally fasten the joint member 20 to the coupling slip member 10.

The spring support member 30, having a T-configuration or other configurations, contains a press slip 36 having a top face 44, a spring support slip 34 attached to the press slip 36, and a shaft rod 32 attached to the spring support slip 34 and slidably receiving a spring 28. The front portion of the spring 28 is abutted against a surface of the spring support slip 34. The spring support member 30 with the spring 28 is inserted into the hollow portion 26 of the joint member 20, so that the spring support member 30 elastically pushes the front portion of the spring 28 and the press slip 36 is placed within the pair of slits 16 of the joint member 20. This allows the temple 40 to be moved and securely positioned in at least two positions with respect to the coupling slip member 10.

Figure 4:
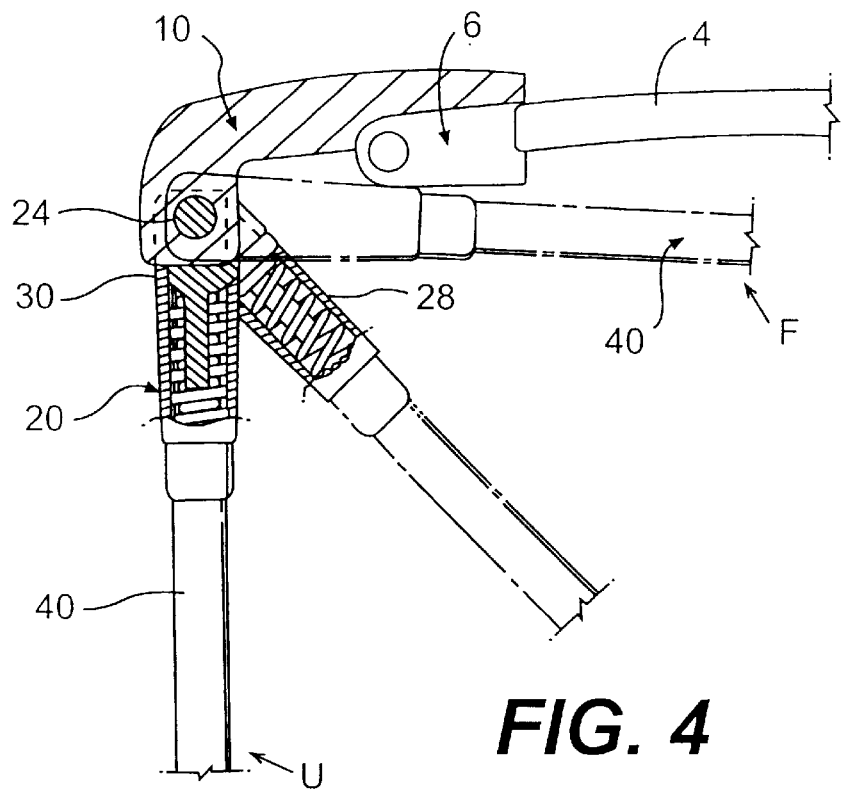
FIG. 4 is a front elevational view of the coupling device of FIG. 2, containing cut-away portions to illustrate a folding position thereof.
Figure 5:
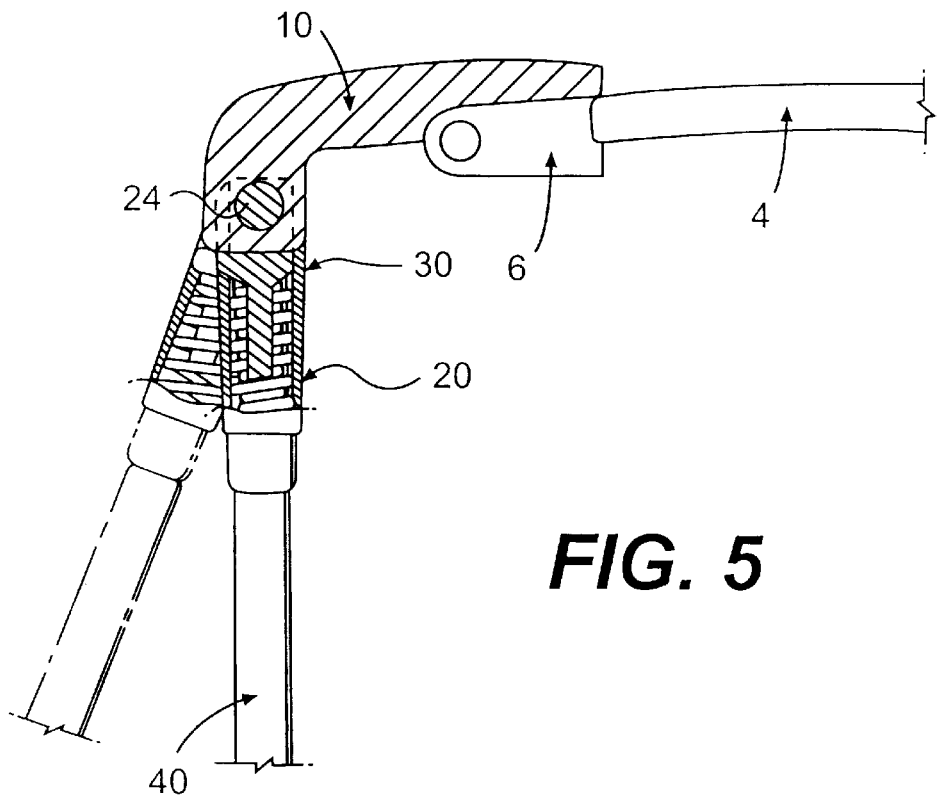
FIG. 5 is a front elevational view of the coupling device of FIG. 2, containing cut-away portions to illustrate an unfolding position thereof.

As shown in FIGS. 4 and 5, the coupling device for an eyeglasses according to the present invention operates as follows. The top face 44 of the slip 36 is in direct contact with the bottom face 46 of the coupling slip member 10 when the temple 40 is in use position U (i.e., as shown in FIG. 2). When the temple 40 is folded toward the lens frame 4 of the eyeglasses 2, the joint member 20 and the temple 40 rotate about the shaft pin 24 and make a certain degree angle rotation (e.g., 20° rotation) towards the lens frame 4. As the temple 40 is rotated, the press slip 36 elastically installed in the joint member 20 is continuously pressed by the corner 42 of the coupling slip member 10 due to the elasticity of the spring 20. If the temple 40 is continuously rotated over a certain angle, the temple 40 is completely folded toward the lens frame 4 by the elasticity of the spring 28 without having to exert additional force on the temple 40. At this time, the top face 44 of the press slip 36 is in direct contact with and completely abuts against the first sidewall 48a of the coupling part 14. Therefore, with little force, the temple 40 is securely fixed at the folded position (F in FIG. 4) because the top face 44 is in full contact with the first sidewall 48a of the coupling part 14.

Likewise, the temple 40 of the eyeglasses 2 in the folded position F is completely unfolded to the use position (U in FIG. 4) by elasticity of the spring 28 when a user applies a gentle force to the temple 40 away from the lens frame 4. Once the top face 44 of the press slip 36 touches the bottom face 46 of the coupling slip member 10, the temple 40 is automatically positioned in the use position U by the elasticity of the spring 28 and remains in that position.

In the meantime, as shown in FIG. 5, if the user pushes temple 40 outwardly away from the lens frame 40, the press slip 36 rotates at a certain angle while being pressed by the second corner 50 of the coupling slip 10 and stops its rotation at some point since the distance between the shaft pin 24 and the opposite corner 50 is longer than the distance that the spring 28 can press.

In assembling, the spring 28 is inserted into the joint member 20 as follows. The spring support member 30 with the spring 28 is inserted into the hollow portion 26 of the joint member 20. At this time, the coupling part 14 of the coupling slip member 10 is inserted into the slits 16 carved in the joint member 20, and the shaft pin 24 is inserted through the apertures 18 and the eccentric slot 8 to hold these members together. Therefore, it is easy and simple to install the spring 28 into the joint member 20.

Accordingly, the coupling device/temple hinge for an eyeglasses according to the present invention has the following advantages. The eyeglasses 2 having a pair of coupling devices in accordance with the present invention is a slim-looking eyeglasses that includes the relatively thin coupling slip member 10 attached to the connection slip 6 and to the joint member 20, and the spring 28 and the spring support member 30 elastically installed. Because the thickness "T" of the coupling slip member 10 is same or substantially same as the thickness "T1" of the front surface 7 of the connection slip 6, the eyeglasses 2 has an attractive appearance. Further, the present invention allows use of a small-size joint member 20.

Moreover, the coupling device according to the present invention has a slim shape and a small size, and is light in weight, simple in structure, inexpensive to manufacture, easy to assemble, durable in use, and refined in appearance.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed:

1. A coupling device for an eyeglasses including a pair of lens frames and a pair of temples, the device comprising:
   a coupling slip member attached to a connection slip of each lens frame of the eyeglasses, said coupling slip member including,
      a welding part attached to a front surface of said connection slip; and
      a coupling part having an eccentric slot;
   a joint member attached to each temple of the eyeglasses, said joint member including,
      a hollow portion disposed in the central portion thereof;
      a pair of slits formed at both sides thereof for providing a pair of joint parts;
      a pair of apertures bored in said pair of joint parts; and
      a shaft pin being inserted through the pair of apertures and the eccentric slot for pivotally attaching the coupling slip member to the joint member; and
   a spring and a spring support member for supporting the spring, said spring support member disposed within said hollow portion of the joint member and including,
      a press slip being inserted in the pair of slits;
      a spring support slip for abutting against the spring; and
      a spring rod for slidably receiving the spring, whereby the pair of temples of the eyeglasses can be elastically folded or unfolded by operation of the spring.

2. The coupling device of claim 1, wherein said welding part of the coupling slip member has a substantially same thickness as the connection slip of the lens frame.

3. The coupling device of claim 1, wherein said joint member has a tapered configuration.

4. The coupling device of claim 1, wherein said spring support member has a T-shaped configuration.

5. The coupling device of claim 1, wherein in a folded position of the temples, the top surface of said press slip is in full contact with a side surface of said coupling part.

6. A coupling device for an eyeglasses including at least one lens frame and temple, the device comprising:
   a coupling slip member attached to the lens frame of the eyeglasses and having a slot;
   a joint member attached to the temple of the eyeglasses and including,
      a hollow portion disposed in the central portion thereof;
      a pair of slits and apertures formed at sides thereof; and
      a fastener being inserted through the pair of apertures and the slot; and
   an elastic unit and an elastic unit support member for supporting the elastic unit, said elastic unit support member and said elastic unit disposed in said hollow portion of the joint member, said elastic unit support member including,
      a press slip being inserted in the pair of slits of said joint member;
      an elastic unit support slip for abutting against the elastic unit; and
      a rod member for slidably receiving the elastic unit, whereby the temple of the eyeglasses can be elastically folded or unfolded by an operation of the elastic unit.

7. The coupling device of claim 6, wherein the coupling slip member includes a welding part attached to a front surface of a connection slip attached to the lens frame.

8. The coupling device of claim 7, wherein said welding part of the coupling slip member has a substantially same thickness as the connection slip of the eyeglasses.

9. The coupling device of claim 7, wherein the coupling member further includes a coupling part having the slot through which said fastener is inserted.

10. The coupling device of claim 6, wherein said joint member has a tapered configuration.

11. The coupling device of claim 6, wherein said elastic unit support member has a T-shaped configuration.

12. The coupling device of claim 6, wherein the fastener is a shaft pin.

13. The coupling device of claim 6, wherein the elastic unit is a spring.

14. The coupling device of claim 6, wherein in a folded position of the temple, the top surface of said press slip is in full contact with a first side surface of said coupling slip member.

* * * * *